E. A. SPERRY.
PROCESS OF PREPARING MERCHANTABLE IRON FROM TIN PLATE SCRAP.
APPLICATION FILED APR. 11, 1908.

906,321.

Patented Dec. 8, 1908.
3 SHEETS—SHEET 1.

INVENTOR
Elmer A. Sperry
BY Buckingham & Ewart
Attorneys

E. A. SPERRY.
PROCESS OF PREPARING MERCHANTABLE IRON FROM TIN PLATE SCRAP.
APPLICATION FILED APR. 11, 1908.

No. 906,321.

Patented Dec. 8, 1908.
3 SHEETS—SHEET 2.

INVENTOR
Elmer A. Sperry
BY Buckingham & Everett
Attorneys.

UNITED STATES PATENT OFFICE.

ELMER A. SPERRY, OF BROOKLYN, NEW YORK.

PROCESS OF PREPARING MERCHANTABLE IRON FROM TIN-PLATE SCRAP.

No. 906,321.  Specification of Letters Patent.  Patented Dec. 8, 1908.

Application filed April 11, 1908. Serial No. 426,613.

*To all whom it may concern:*

Be it known that I, ELMER A. SPERRY, a citizen of the United States, residing at Brooklyn, in the county of Kings and State of New York, have invented new and useful Improvements in Processes of Preparing Merchantable Iron from Tin-Plate Scrap, of which the following is a specification.

This invention relates to the preparing of merchantable iron from tin plate scrap and it consists in treatment both prior to and after the detinning step proper which is calculated to better fit the scrap for merchandising and also for furnacing. The detinning step in connection with this invention may be suitably formed by any well-known process but it is understood that the preferred process for the detinning step is based on the chemical reaction between chlorin and metallic tin which produces stannic chlorid. Tin or any tin bearing material, such for instance as tin plate scrap may be considered as suitable for the supply of the metal.

The tin scrap shipped in open cars when apparently dry, usually contains about 1% of moisture, and at the same time contains less than $2\frac{1}{2}\%$ of tin. The prior treatment and especially the careful drying of the tin bearing material or scrap before the reaction, becomes therefore extremely desirable.

Inasmuch as the present process, though not limited thereto, contemplates the use of moist chlorin and is enabled to produce 95% of tin product in the anhydrous form, the importance of the preparatory steps of both the reagent and the tin bearing material itself will at once become apparent.

When reclaiming the values from tin scrap as for instance by making the chlorin compounds of tin from scrap containing about $2\frac{1}{2}\%$ of tin, the heat generated is sufficient to raise the scrap as a whole, including the steel plate with specific heat of .1 to a very high temperature, unless the heat of the reaction is absorbed. Whereas dry chlorin or moist chlorin in the presence of anhydrous stannic chlorid does not attack steel, yet owing to the zone where the tin and steel are alloyed, the complete removal of the tin, which can only be accomplished by chlorin so far as known, leaves this zone in a spongy state with a great many minute particles of iron resting upon the surface of the black scrap, which are usually converted into halogen compounds of iron.

The invention further relates to the preparation of both the tin bearing material or tin scrap before it is reacted upon, and a prior treatment of the reagent itself for purposes of better fitting it for these reactions. The treatment of the scrap prior to detinning consists in part in cleansing the scrap from foreign substances, such as fats, oils, comestibles, and also from metals other than tin, including solder, antimony, etc., also the preparation of the tin scrap both prior to and after billeting, or compacting into bundles.

It further consists in cooling during reacting period or reacting under conditions of temperature control and also such conditions of internal stress and pressure as are calculated to open up the interstices of the scrap to allow better penetration, heating the scrap to quite a high degree to dry same, treating the reagent and reacting upon same while hot, or before allowing the scrap to cool, reclaiming the tin bearing products either as liquid, solids, gases or vapors, and also in further treatment of the resulting black scrap, whereby it is first freed from the reagents or products of the reaction and afterward is rendered fit for the market, and also a special treatment is given to fit this scrap for furnacing.

The process consists in the prior treatment, bundling or compressing the scrap to a point best suited for the detinning step. If this is found too loosely compacted for furnacing or where the opening up of the compacted scrap during the process or any of the steps is excessive or where for any reason the resulting black scrap is not found to be sufficiently dense for the metallurgical or iron working processes to follow; the billets or bundles are re-compacted or supercompressed by any of the well-known methods as by hammering, or, for instance, by the use of the press shown and described, as will be readily understood. This part of the process consists in compressing, bundling or billeting the scrap in two stages, between which occur the other steps constituting the process. These may or may not be accompanied by changes in temperature, mechanical stress for opening up the scrap, centrifugal action or other phenomena hereinafter described. A novel and useful technical feature is thus secured in hastening the reaction and treatment in other steps of the process, through the comparative openness of the scrap which is compressed, and at the same time being capable of delivering black scrap compacted to the high degree required by the metallurgist.

Other details are described in the specification, illustrated in drawings and pointed out in the claims forming a part hereof.

Referring now to the accompanying drawings which are employed simply as illustrating one method of carrying out my invention and in which the reference characters indicate similar parts throughout: Fig. 4 is a diagrammatic view of a billeting press. Fig. 11 is an exterior view of the reaction vessel together with one of the condensers and the separator showing connections. Figs. 12 and 13 are sections of the lower valve. Fig. 14 shows a diagrammatic horizontal section of another valve. Fig. 15 shows a diagrammatic horizontal section of a valve between the two condensers and separator.

The tin-bearing material or tin scrap receives treatment prior to the detinning step proper, which may consist of the following steps: The scrap may be boiled in reservoir 33 (Fig. 2), the container carrying the scrap handled by crane 34. This vessel may or may not be heated by furnace 35. Reservoir 33 contains caustic alkali or a compound containing free alkali, and serves to saponify fat, filth and comestibles clinging to the scrap, especially to old scrap. After saponification in vessel 33 the container is suitably washed and rinsed, as in vessel 36, from whence it may pass to the desoldering apparatus shown in Fig. 3. Here the scrap 44 is made to pass through a highly heated zone as in cylinder 37 within the furnace 38, provided with stack 41. The scrap may be fed by hopper 39 and issues through the eduction tube 40.

The scrap, either before or after being desoldered, preferably the latter, and either while hot or after being cooled, is passed through the mangling rolls 42 and 43, running in opposite directions and preferably at differential speeds. This serves to dismember mangle or shred the scrap and prepare it more easily for the next step in the process, namely, the pressing, compacting or billeting, shown in Fig. 4.

Figures 1, 2, 3, 5:
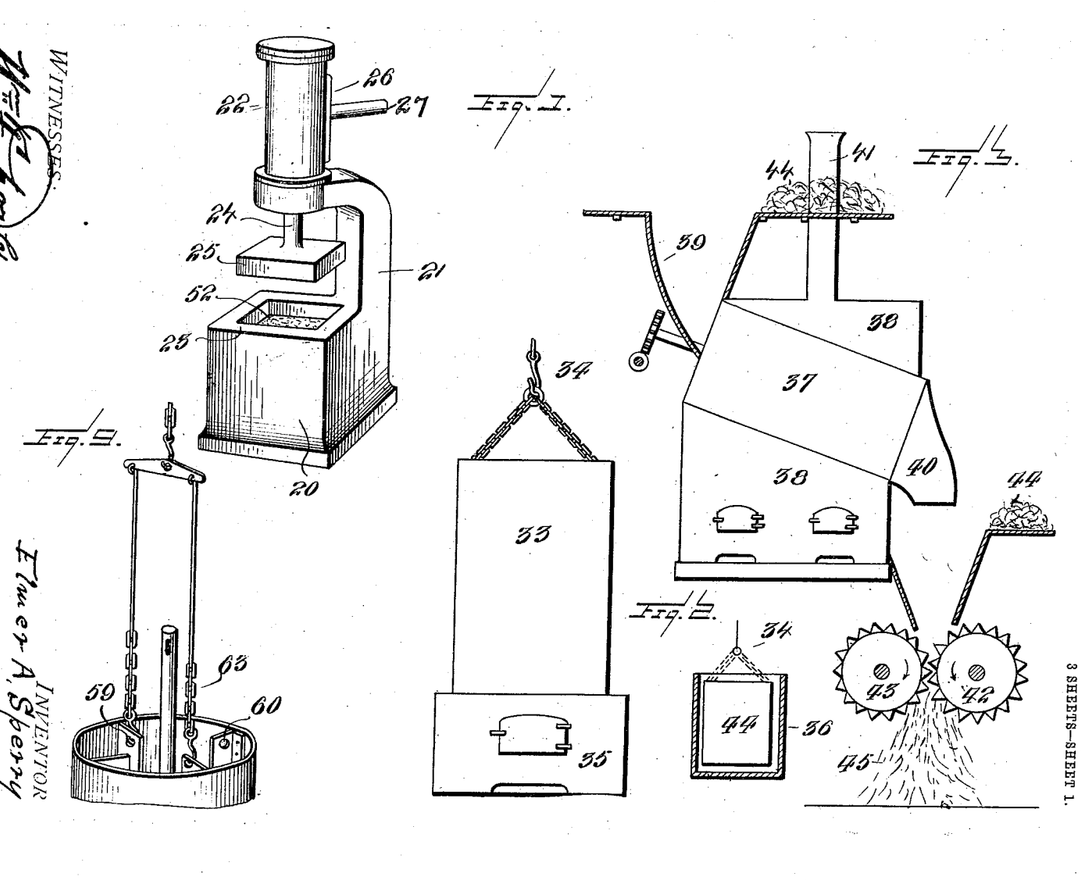
Figure 1 shows the re-compacting or super-compressing hammer for the billets.
Fig. 2 illustrates the saponification and washing apparatus.
Fig. 3 illustrates the de-soldering furnace and mangling or dismembering apparatus in diagram.
Fig. 5 illustrates one of the laminated billets.
Figure 10:
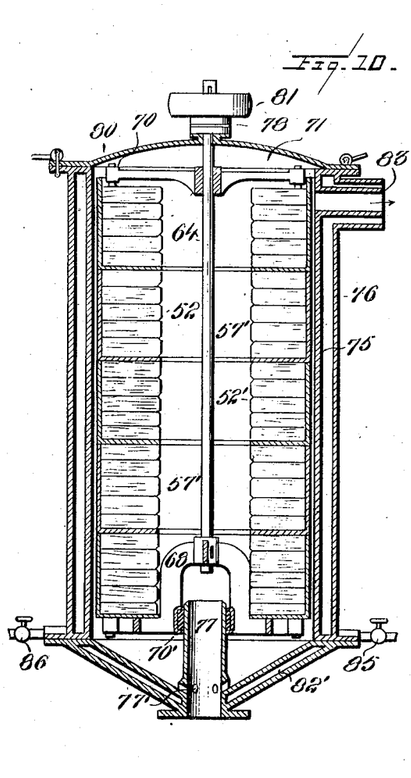
Fig. 10 is a view of the reaction chamber with the tin billets in place therein, in vertical section.

44 indicates the scrap before mangling and 45 after mangling. The mangled scrap 45 is then fed into a continuously acting press deriving its power from a suitably driven crank 46, either direct or through gears such for instance as the elliptical gears 47—47, the driving gear being preferably connected with the fly-wheel 48. The crank 46 serves to operate a pitman 49 and plunger 50 which reciprocates so as to open the hopper 51 on its backward stroke and hold same closed on its forward stroke. When back, a small mass of the scrap 45' is thrown in front of the plunger 50 and added to the billet 52 successively, until same is completed, whereupon a septum, as for instance a sheet iron plate, is dropped into place to completely separate the billets. The resistance to the forward movement of the line of billets 52—52, &c. is obtained through lateral pressure of the springs 53—53 &c. which press upon one or more sides of the billet through the medium of flexible walls 54 of the rectangular tubular extension in front of the ram or plunger 50 and from the far end of which the billets 52 gradually issue. It will be noticed that these billets are laminated flatwise through the successive additions of portions or layers 52', 52 &c. and also that the billets themselves are preferably rectangular and flat, as shown in Figs. 4, 5 and 10; but any shaped billet may of course be employed. The billets 52 are now introduced into the process proper, either direct or after undergoing further pre-treatment. When used, this pre-treatment consists in the steps presently to be explained.

Figures 6, 7, 8, 9:
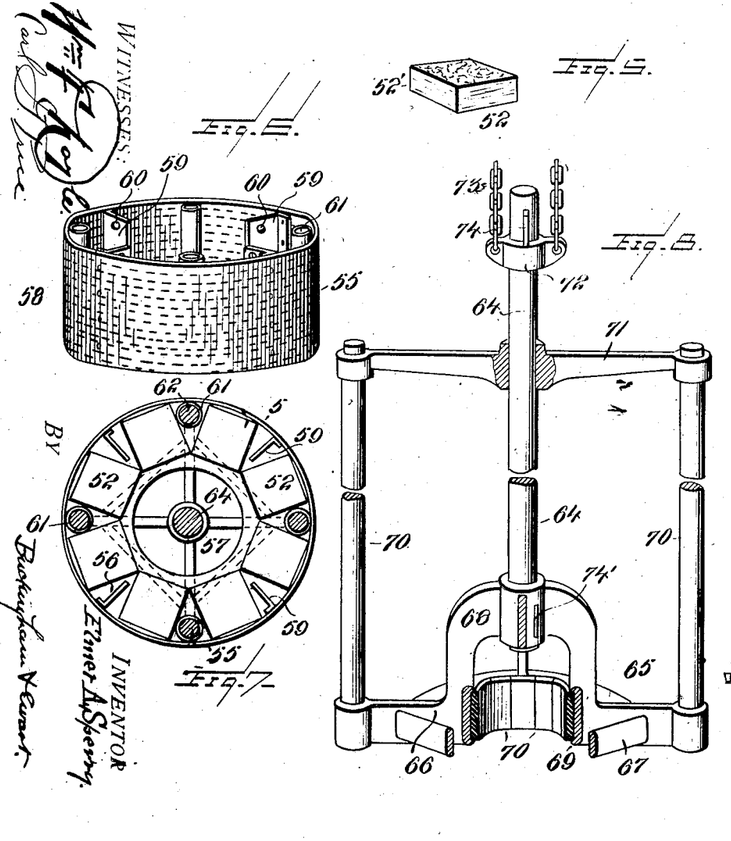
Figs. 6 and 7 are the details of the perforated cylindrical retainer.
Fig. 8 is detail showing the skeleton of the shaft with its revolving parts.
Fig. 9 illustrates the method of handling one of the retainers.

Circular tubs or retainers 55 are provided with a floor 56 perforated with a large central opening 57 the periphery of which consists of perforated metal as shown in Fig. 6 and indicated at 58. Interior to this retainer are internal radial ribs 59 perforated at their upper ends at 60 and serving to act as handles to the retainers and guides for the billets 52 as indicated in Fig. 7. Intermediately disposed are tubular extensions 61 which register with four equidistant openings 62 in the floor of the retainer. Into this basket are placed billets 52 to the height of, say, five, one upon the other, 40 in all, and leaving a central space or opening 57' the retainer as a whole being handled by a crane, as shown in Fig. 9 with the hooks 63 engaging the openings 60 in the plate 59. For reception of a number of these retainers say five as is shown in Fig. 10, there is a framework consisting of a central shaft 64 provided at its lower extremity with a spider 65 consisting of radial arms 66 and braces 67 engaging the shaft 64 by webs 68 and serving to hold the ring 69 in which are located the graphite blocks 70' serving as a chemically inert journal or guide for the lower end of this organization. At the extremity of each of the radial arms are the tubes or bars 70 serving as vertical guides for the retainers and coöperating with the openings 62 therein, the spider 71 at the top being removed while the retainers are being slipped upon the guides or tubes 70, by means of the crane device shown in Fig. 9. After the last basket is in position, the spider 71 is placed over the tops of the guides 70, thus fixing their upper ends with reference to the central shaft 64. Hanger 72 slips over the end of the shaft simply for the purpose of handling the group of retainers as a whole by chains 73 and key 74. A similar key 74' is used at the bottom of the shaft for securing and hanging the spider 65. The assembled retainers being now secured to the shaft, it may be lowered into any one of the chambers provided for its reception where the scrap may be washed, treated or dried, or where it is dried and heated, or the chamber 75, jacketed as shown at 76, Fig. 10 provided with a stationary upward projection of its bottom tube 77 perforated for draining at 77', on the outside of which the graphite blocks 70' impinge, acting in their capacity as guide and journal. It should be remembered that the load is perfectly supported through the shaft 64, by the ball bearing 78 on the top of gland 79, forming a part of the cover 80 of the vessel. This ball thrust bearing may be plainly seen in Fig. 11 as being under the flanged pulley 81, the key 74 being now used as a driver as well as hanger between pulley 81 and the shaft 64. The organization is such that a small amount of power applied to pulley 81 will revolve the mass within the chamber 75. The ends as well as the sides of this retainer may be jacketed as indicated at 82' at the bottom and an eduction passage is provided preferably at the top indicated by passage 83, and preferably also tangentially disposed as indicated in Fig. 16.

Figures 9, 11, 13, 14, 15, 16:
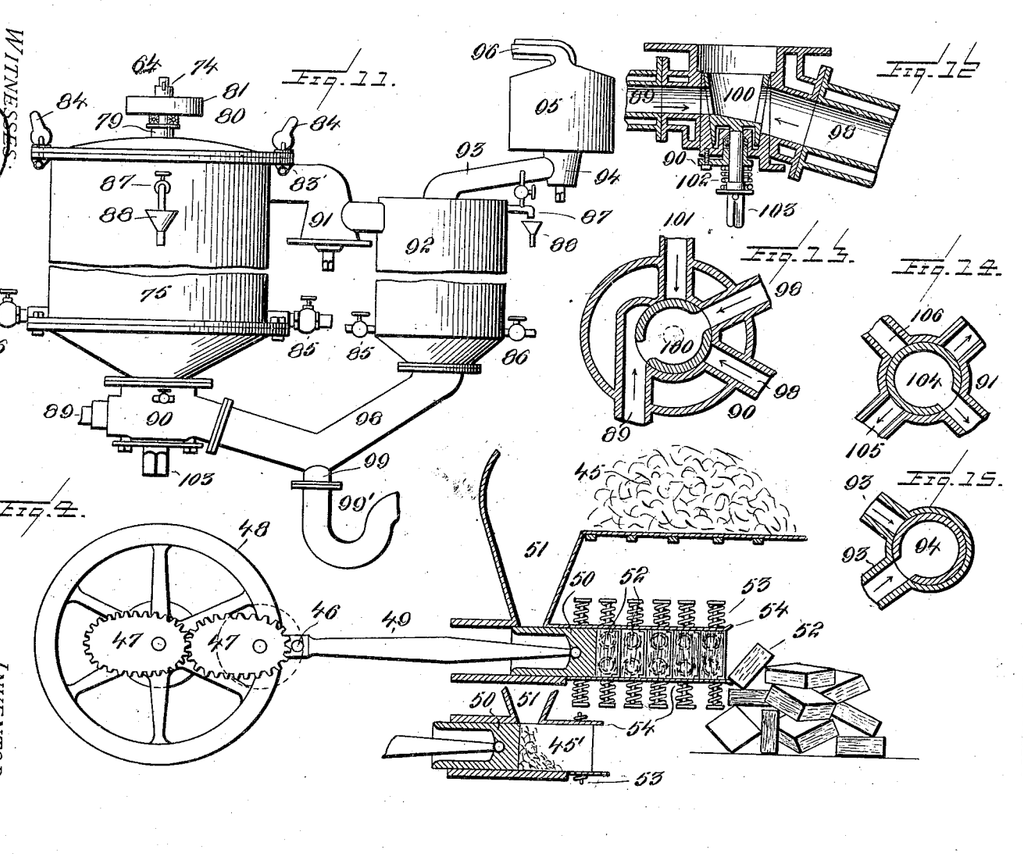

Referring now to Fig. 11, the exterior of the vessel 75 is shown with its eduction passage 83 and cover 80 attached as by quickly operating cams 85 operating in slots on the cover in the well-known manner. Means for heating this vessel are shown at 85, and for cooling the vessel shown at 86 and also 87 being a valved sight discharge into funnel 88. The reagent reaches the vessel through the smaller pipe 89 and traverses jacketed valve 90, thence upwardly into the reaction vessel 75, out through another valve 91, preferably jacketed and connected to the discharge opening, each of these valves being piped to the respective ends of the cooler or condenser 92 which is also provided with heating means 85 and cooling means 86, and also with a similar valved sight-discharge apparatus 87 and 88. The condenser 92 is suitably jacketed as is preferably also the pipe 93 leading from its upper end and connecting with valve 94 and separator 95, the top of the separator being connected by jacketed discharge pipe 96 with the tower or scrubber 97. The passage 98, preferably jacketed for temperature control, serves to connect valve 90 with the lower end of the condenser or cooler 92 and is provided with a discharge opening for liquids or products indicated at 99. Trapped as shown at 99'.

The valve 90 is shown in section in Figs. 12 and 13, the upward discharge being connected simultaneously with the jacketed pipe 98 and also with the chlorin supply pipe 89, the flow of the gases being indicated by the arrows, the moving part of the valve 100 serving to connect the reaction chamber 75 with the various passages which are designated on the drawing. The condensers may be two in number, only one of which is connected with the reaction chamber at a time, but in each instance the chlorin connection 89 is uninterrupted. But both passages 98 and 89 are interrupted when the communication is made with the hot air passage 101. The valve is suitably drawn and held to its seat as by springs 102 and operated by a stem 103. The valve 91 is indicated in section in Fig. 14, and its central chamber may be put in communication, one at a time, with any one of the 4 passages shown in said figure. Valve 94 serves to establish communication between the separator 95 and one or the other of the condensers 92 by pipes 93—93, or its revolving part may be so turned as to stop off all communication with either of the condensers.

Prior to the introduction of the load of scrap into the chamber 75 it is preferably heated and thoroughly air-washed in any suitable inclosure, such as for instance an oven or furnace, preferably under conditions of centrifugal stress which opens up the interstices thereby facilitating heating and drying. Prior to its introduction to the oven or furnace, the scrap after being packed into the baskets and the baskets assembled, they may be lowered into a washing tank and there washed and afterward rinsed, should they be found to require this treatment. After they have been introduced into the tank 75, the valves 90 and 91 may be so adjusted as to communicate with any suitable source of hot air and may be again air-washed, either quiescent or while spinning, and under conditions of centrifugal stress, all prior to the step of detinning. The pressures in this case, as will be seen, are all applied substantially parallel with the laminæ 52' of the bundles. In connection with drying, the scrap may also be heated and cooled, which in and of itself tends to open up the interstices of the compacted scrap to a remarkable degree and thus facilitate the drying. After the reaction is completed, the scrap is then heated to a high degree and may be then or afterward, air-washed with heated air, all under conditions of centrifugal stress or change in centrifugal stress, for removing the last trace of both the reagent and the product. The remaining black scrap now goes to a suitable chamber 111 after the reaction and the separating treatment above described in the reaction vessel 75. Here it is washed free of any remnant of the reagent or products, and treated with a suitable nonrusting material, or compound, such for instance as caustic alkali. The group of retainers are then dismembered. Each retainer is in turn lifted from its position around the shaft, and the billets removed from the retainers, as by dumping, and the retainers refilled, and the process repeated. The billets dumped from the retainers have been subjected to considerable stress in opening up their interstices or, if for any other reason they require re-packing or super-compressing this may be accomplished by the hammer shown in Fig. 1 which is of the ordinary construction and consists of the hollow base, or dye 20 on which the bundle 52 may be seen and which is adapted to receive the heavy platen 25, supported on the piston 24, driven by the cylinder 22, which is supplied with steam chest 26 and steam pipe 27 and is supported from the base by the arm 21. Any other suitable form of hammer or compressing apparatus may be employed as for instance those shown in Fig. 4 where the springs 53 may be adjusted to offer more than normal resistance to the billets 52 which may thus be re-compressed or super-compressed, as will be readily understood.

The use and operation of this apparatus will be readily understood from the foregoing description. It may, however, be pointed out that the tin-bearing material, for instance the tin scrap, after having gone through such preparation as is necessary is treated in the reaction vessel 75 preferably under conditions of centrifugal stress by the rotation of the assembled retainers upon the axis 64, the perforated cylindrical walls of the retainers and radially exposed billets of scrap, together with the radial plates 59 and also the radial webs 68, all acting in conjunction with the large central opening 57′ produce a definite fan action and throw the fluids vigorously toward the outer wall of the vessel 75 the gases and vapors and also the heated air carrying moisture, ultimately passing through the tangentially disposed discharge opening 83.

It will be readily understood that the scrap treated by this process need not be billeted, but when so billeted it is possible to develop in a 60″ retainer a pressure of over 100 lbs. per square inch on the interior of the billets by a comparatively slow rotative speed of the retainer about the shaft 64. This organization requires practically no power except for overcoming the inertia, inasmuch as the whole load is borne by the ball bearing seen in Fig. 11 below pulley 81. It will further be noticed that the centrifugal stress thus developed is unilinear in direction and is at right angles to the line of the thickness of the billets and also at right angles to the line of pressure applied in the compacting of the billets, and furthermore in line with the laminations 52 within the billets, whereby the interstices of the compacted scrap are opened up vigorously for the entrance of the reagent, removal of the product for the heating both before and after the reaction, for the drying off of the product and for the impregnation of the mass by the alkali described.

The preliminary treatment of both the reagent and the tin scrap has been variously described by me in this art and need not further be pointed out here, except to mention that the tin scrap, especially old tin scrap, should be dismembered and mangled or shredded, not only for purposes of better attack by the reagent, but for purposes of constructing billets which will more readily cohere and not readily disintegrate under the conditions of being compiled in layers or by separately added portions. Especially is this true when the billets have not been compacted as densely as possible before the reaction and are then placed under stresses and centrifugal pressures which tend to open them up and render necessary the re-compacting or super-compressing of such bundles after the step of detinning and cleansing of the scrap has been completed. This recompacting may be done by any suitable machine, as for instance that shown in Fig. 4 wherein the springs 53 may be adjusted for greater compression and the billets one after the other subjected to heavier pressures than formerly or the recompacting or super-compressing may be accomplished by placing the bundles under the hammer shown in Fig. 1 where they are very vigorously compacted or super-compressed, being thereby rendered more suitable for furnacing, the billets after having been compressed, being removed in any suitable manner, as for instance through the bottom of the dye in the base 20 of the hammer.

Having pointed out the essential features of my process or method of producing halogen compounds of tin, I may state that the process should not in any way be limited to the exact details of the method or apparatus described herein with reference to any particular step or indeed the exact order of the steps, which are simply given as illustrating one method of carrying my process into effect.

It should be mentioned that this process may be varied in some of its parts to suit the special form of tin bearing material or the peculiarity of the reagent itself, thus the process should be suited to the changes in characteristics of both elements, and in this instance steps may be altered or omitted and others may be employed, and the invention extends to such use.

I claim:

1. The process of preparing merchantable iron from tin plate scrap which consists in compacting the scrap in laminated bundles, treating the bundles with mechanical stress in line of the laminations, for opening up the interstices of the bundles, for the purpose specified and recompressing such bundles at right angles to the laminations.

2. The process of preparing merchantable iron from tin plate scrap which consists in suitably treating the scrap and mangling same, treating with a reagent capable of removing the tin separately recovering the resulting black scrap and the tin bearing products and compacting the former into coherent bundles.

3. The process of preparing merchantable iron from tin plate scrap which consists in compacting the scrap at an elevated temperature, into bundles, suitably treating the scrap for removal of the tin and recompressing the said bundles.

4. The process of preparing merchantable iron from tin plate scrap which consists in compressing the scrap into bundles, treating same with a reagent for the removal of the tin, removing the products thus produced by centrifugal action and recompressing the scrap.

5. The process of preparing merchantable iron from tin plate scrap which consists in compressing the scrap into bundles, treating the scrap with a detinning reagent, heating the same under conditions of centrifugal action and recompressing the scrap.

6. The process of preparing merchantable iron from tin plate scrap which consists in saponifying and washing the scrap, billeting same, heating the billets to drive off moisture, treating with a reagent capable of recovering the tin and separately recovering the resulting black scrap and the tin bearing products.

7. The process of preparing merchantable iron from tin plate scrap which consists in saponifying and mangling the scrap, bundling same, treating with a reagent capable of removing the tin, separately recovering the resulting black scrap and the tin bearing products and recompressing the said bundles.

8. The process of preparing merchantable iron from tin plate scrap which consists in drying the scrap, bundling same, treating with a reagent capable of removing the tin, separately recovering the resulting black scrap and the tin bearing products and recompressing the said bundles.

9. The process of preparing merchantable iron from tin plate scrap which consists in drying the scrap at an elevated temperature, billeting same, treating with a reagent capable of removing the tin and separately recovering the resulting black scrap and the tin bearing products, and recompressing the said billets.

10. The process of preparing merchantable iron from tin plate scrap which consists in de-soldering the scrap, billeting same, treating with a reagent capable of removing the tin and separately recovering the resulting black scrap and the tin bearing products, and recompressing the said billets.

11. The process of preparing merchantable iron from tin plate scrap which consists in de-soldering and mangling the scrap, billeting same, heating the billets to drive off moisture, treating with a reagent capable of removing the tin and separately recovering the resulting black scrap and the tin bearing products.

12. The process of preparing merchantable iron from tin plate scrap which consists in saponifying and then de-soldering the scrap, billeting same, treating with a reagent capable of removing the tin and separately recovering the resulting black scrap and the tin bearing products, and recompressing the said billets.

13. The process of preparing merchantable iron from tin plate scrap which consists in compacting the scrap in bundles by pressure, the bundles being relatively thin along the line at which the pressure is applied, treating with a reagent capable of removing the tin separately recovering the resulting black scrap and the tin bearing products and recompacting the bundles by pressure applied along the line of the original pressures.

14. The process of preparing merchantable iron from tin plate scrap which consists in compacting the scrap at an elevated temperature in bundles by pressure, treating with a reagent capable of removing the tin and separately recovering the resulting black scrap and the tin bearing products.

15. The process of preparing merchantable iron from tin plate scrap which consists in compacting the scrap in laminated bundles by pressure, treating with a reagent capable of removing the tin separately recovering the resulting black scrap and the tin bearing products and recompacting the bundles by pressure applied at right angles to the laminations.

16. The process of preparing merchantable iron from tin plate scrap which consists in compacting the scrap in laminated bundles by pressure, the laminations being at a substantial angle to the line at which the pressure is applied, treating with a reagent capable of removing the tin and separately recovering the resulting black scrap and the tin bearing product and recompacting the bundles by pressure applied along the line of the original pressures.

17. The process of preparing merchantable iron from tin plate scrap which consists in compacting the scrap in laminated bundles, the bundles being relatively thin, the laminations being flatwise of the bundles, treating with a reagent capable of removing the tin and separately recovering the resulting black scrap and the tin bearing products.

18. The process of preparing merchantable iron from tin plate scrap which consists in compacting the scrap in bundles by a plurality of separate additions of scrap compacted under pressure, constituting laminations within the bundle, treating with a reagent capable of removing the tin and separately recovering the resulting black scrap and the tin-bearing products.

19. The process of preparing merchantable iron from tin plate scrap which consists in billeting the scrap, packing the billets into retainers, subjecting the group of billets thus packed to a suitable preliminary treatment for the purpose of drying same prior to de-tinning, then treating with a reagent capable of removing the tin and separately recovering the resulting black scrap and the tin bearing products.

20. The process of preparing merchantable iron from tin plate scrap which consists in billeting the scrap, packing the billets into retainers, heating the group of billets thus packed, treating with a reagent capable of removing the tin and separately recovering the resulting black scrap and the tin bearing products.

21. The process of preparing merchantable iron from tin plate scrap which consists in billeting the scrap, packing the billets into retainers, treating the group of billets thus packed with hot air, treating with a reagent capable of removing the tin and separately recovering the resulting black scrap and the tin bearing products.

22. The process of preparing merchantable iron from tin plate scrap which consists in billeting the scrap, packing the billets into retainers, treating the group of billets thus packed with heat to dry same and facilitating the escape of moisture from the interstices of the billets by opening up the mass while thus heating, treating with a reagent capable of removing the tin and separately recovering the resulting black scrap and the tin bearing products.

23. The process of preparing merchantable iron from tin plate scrap which consists in billeting the scrap, packing the billets into retainers, treating the group of billets thus packed with heat to dry same and facilitating the escape of moisture from the interstices of the billets by opening up the mass by centrifugal stress while thus heating, treating with a reagent capable of removing the tin and separately recovering the resulting black scrap and the tin bearing products.

24. The process of preparing merchantable iron from tin plate scrap which consists in billeting the scrap, packing the billets into retainers, treating the group of billets thus packed with heat to dry same and facilitating the escape of moisture from the interstices of the billets by opening up the mass by pressure independent of the pressure of the surrounding media while thus heating, treating with a reagent capable of removing the tin and separately recovering the resulting black scrap and the tin bearing products.

25. The process of preparing merchantable iron from tin plate scrap which consists in billeting the scrap, packing the billets into retainers treating the group of billets thus packed with heat to dry same and facilitating the escape of moisture from the interstices of the billets by opening up the mass in the presence of a moving gaseous medium while thus heating, treating with a reagent capable of removing the tin and separately recovering the resulting black scrap and the tin bearing products.

26. The process of preparing merchantable iron from tin plate scrap which consists in compressing the scrap into laminated billets, packing the billets into retainers, treating the group of billets thus packed with heat to dry same and facilitating the escape of moisture from the interstices of the billets by opening up the mass by unilinear pressure applied transversely to the layers while thus heating the scrap, treating with a reagent capable of removing the tin and separately recovering the resulting black scrap and the tin bearing products.

27. The process of preparing merchantable iron from tin plate scrap which consists in billeting the scrap, packing the billets into retainers, placing the retainers within a suitable inclosure, applying pressure and causing a current of gas to flow within the inclosure for drying same, treating with a reagent capable of removing the tin and separately recovering the resulting black scrap and the tin bearing products.

28. The process of preparing merchantable iron from tin plate scrap which consists in billeting the scrap, packing the billets into retainers around a central space and drying the scrap by causing a flow of gas developed by rotating the retainer so packed, treating with a reagent capable of removing the tin and separately recovering the resulting black scrap and the tin bearing products.

29. The process of preparing merchantable iron from tin plate scrap which consists in billeting the scrap, packing the billets into retainers around a central space and drying the scrap by causing a flow of gas developed by rotating the retainer so packed, heating the scrap, treating with a reagent capable of removing the tin and separately recovering the resulting black scrap and the tin bearing products.

30. The process of preparing merchantable iron from tin plate scrap which consists in billeting the scrap, packing the billets into retainers around a central space, placing the retainers within a chamber provided with a central induction and a peripheral eduction opening and drying the scrap by flow of fluid established by rotating the retainer, heating the group of billets thus packed, and treating with a reagent capable of removing the tin.

31. The process of preparing merchantable iron from tin plate scrap which consists in packing the scrap into bundles, suitably treating the scrap for removal of the tin and recompressing the scrap.

32. The process of preparing merchantable iron from tin plate scrap which consists in billeting the scrap, packing the billets into retainers around a central space, placing the retainers within a chamber provided with suitable induction and eduction opening and developing a fluid current from the central space outwardly through the scrap for drying same, then, treating with a reagent capable of removing the tin and separately recovering the resulting black scrap and the tin bearing products.

33. The process of preparing merchantable iron from tin plate scrap which consists in compressing the scrap into bundles, detinning with a reagent, treating the scrap with centrifugal action during detinning, for the purpose of effecting quicker penetration of the bundles by the said detinning reagent and recompressing the scrap.

34. The process of preparing merchantable iron from tin plate scrap which consists in billeting the scrap, packing the billets into retainers, heating the group of billets thus packed under the combined condition of flow of gases through the scrap and centrifugal action, treating with a reagent capable of removing the tin and separately recovering the resulting black scrap and the tin bearing products.

35. The process of preparing merchantable iron from tin plate scrap which consists in compressing the scrap into flat billets, packing the billets flatwise into circular rows, suitably preparing the scrap so packed and treating same with a reagent capable of removing tin causing the fluids to flow through said scrap by centrifugal action separately recovering the resulting black scrap and the tin bearing products.

36. The process of preparing merchantable iron from tin plate scrap which consists in compressing the scrap into laminated billets, packing such billets to form a cylinder with the laminations in a plane normal to the axis, suitably preparing the scrap so packed causing the fluids to flow through said scrap by centrifugal action treating same with a reagent capable of removing tin and separately recovering the resulting black scrap and the tin bearing products.

37. The process of preparing merchantable iron from tin plate scrap which consists in compressing the scrap into flat billets, packing the billets flatwise into a cylindrical retainer, the plane of the billets being normal to the axis treating same with a reagent capable of removing tin causing the fluids to flow through said scrap by centrifugal force and separately recovering the resulting black scrap and the bearing products.

38. The process of preparing merchantable iron from tin plate scrap which consists in compressing the scrap into laminated billets, packing such billets within a cylindrical retainer with the laminations in a plane normal to the axis, causing the fluids to flow through said scrap by centrifugal force treating same with a reagent capable of removing tin and separately recovering the resulting black scrap and the tin bearing products.

39. The process of preparing merchantable iron from tin plate scrap which consists in compressing the scrap into bundles, treating the scrap with heated gas, under centrifugal action for hastening the heating and drying of the scrap, prior to detinning, detinning the scrap and then recompressing the bundles.

40. The process of preparing merchantable iron from tin plate scrap which consists in compressing the scrap into bundles, treating the scrap with a detinning reagent under centrifugal action and recompressing the scrap.

41. The process of preparing merchantable iron from tin plate scrap which consists in compressing the scrap into bundles, treating the scrap with a detinning reagent under conditions of mechanical pressure for opening up the interstices in the bundles for hastening the action during detinning as described, and then recompressing the scrap.

42. The process of preparing merchantable iron from tin plate scrap which consists in compressing the scrap into bundles, detinning with a reagent, treating the scrap with differing temperatures during detinning for the purpose of quicker penetration of the bundles by the said detinning reagent, and recompressing the scrap.

In testimony whereof I have hereunto set my hand in presence of two subscribing witnesses.

ELMER A. SPERRY.

Witnesses:
A. MATTULLATH,
FRANCIS O. PAUST.